(12) United States Patent
Olson

(10) Patent No.: US 7,002,579 B2
(45) Date of Patent: Feb. 21, 2006

(54) SPLIT SCREEN GPS AND ELECTRONIC TACHOGRAPH

(75) Inventor: Bruce Olson, Bedford, NH (US)

(73) Assignee: Cadec Corporation, Londonderry, NH (US)

(*) Notice: Subject to any disclaimer, the term of this patent is extended or adjusted under 35 U.S.C. 154(b) by 104 days.

(21) Appl. No.: 09/852,206

(22) Filed: May 9, 2001

(65) Prior Publication Data

US 2002/0167519 A1  Nov. 14, 2002

(51) Int. Cl.
  G06T 11/20 (2006.01)
  B60Q 1/00 (2006.01)
  H02H 7/06 (2006.01)
  G01P 3/42 (2006.01)
  G01D 9/00 (2006.01)

(52) U.S. Cl. .................. 345/440; 340/425.5; 340/500; 322/31; 324/160; 346/18

(58) Field of Classification Search ............... 345/440, 345/419, 441, 425.5, 670, 450.2, 466, 467, 345/500, 440.1; 701/35; 709/223; 322/31; 346/18; 324/160

See application file for complete search history.

(56) References Cited

U.S. PATENT DOCUMENTS

| | | | |
|---|---|---|---|
| 4,484,284 A * | 11/1984 | Tagami et al. | 701/208 |
| RE32,357 E * | 2/1987 | Nagao et al. | 701/207 |
| 5,748,109 A * | 5/1998 | Kosaka et al. | 340/995.14 |
| 5,815,161 A * | 9/1998 | Emmerink et al. | 345/440 |
| 5,894,311 A * | 4/1999 | Jackson | 345/440 |
| 5,936,315 A * | 8/1999 | Lais | 701/35 |
| 6,173,277 B1 * | 1/2001 | Ashby et al. | 707/1 |
| 6,307,573 B1 * | 10/2001 | Barros | 345/764 |
| 2002/0120728 A1 * | 8/2002 | Braatz et al. | 709/223 |
| 2002/0149586 A1 * | 10/2002 | Maeda et al. | 345/440 |

* cited by examiner

Primary Examiner—Sumati Lefkowitz
Assistant Examiner—Chante Harrison
(74) Attorney, Agent, or Firm—Devine, Millimet & Branch; Paul C. Remus; Michelle Saquet Temple

(57) ABSTRACT

This invention teaches an inventive method for tracking trip data in relation to geographic position for a vehicle. The first steps in the method involve recording trip data periodically and recording geographic position periodically. Each trip data recording is time stamped. Each geographic position recording is time stamped. The next step is saving the recorded trip data and geographic position to a database. The final step in the inventive method is graphically displaying the trip data and the geographic position, as a function of time, from the database. This invention also covers an apparatus and a system for carrying out the inventive method.

6 Claims, 4 Drawing Sheets

SPLIT SCREEN GPS AND ELECTRONIC TACHOGRAPH

FIELD OF THE INVENTION

This invention is in the field of computer and satellite aided geographic positioning. Specifically this invention is in the field of computer and satellite aided geographic positioning and tracking of vehicle trip data and vehicle geographic positioning.

BACKGROUND OF THE INVENTION

Today's modem vehicle onboard computer systems have the ability to collect trip data such as speed, engine rpm, and other vehicle or engine data on a continual basis. This trip data is then analyzed for driver performance of shifting and driving patterns and investigating the circumstances surrounding an accident or traffic violation. To analyze trip data from a vehicle, one must present a useable display of the data that presents all of the elements in a clear inter-related fashion. It is also important to tie the trip data with the geographic position of the vehicle, for example to check speed down a steep hill or driving patterns in a normally congested area.

Electronic Tachograph (ETOG) systems have been available for many years to record trip data. A system is presently available in the industry where the speed and revolutions per minute (RPM) of the vehicle are collected at short intervals (typically 1 sec per reading). This trip data is collected on the vehicle and transmitted to an office database for analysis. The system typically displays the data in graphs of speed and RPM vs. time.

Newer systems have also incorporated global positioning satellites (GPS) to record a vehicle's geographic position in Latitude/Longitude. These systems record that position on a frequent basis, and construct a "bread crumb trail" to analyze the route the vehicle took.

None of the existing systems have successfully organized geographic position with trip data in an integrated fashion, although such a combination has several potential uses. If a driver gets a speeding ticket the user can point to the location where the ticket was given and analyze the vehicle speed surrounding that location and confirm whether or not the vehicle was actually speeding. Sometimes a driver is found to have "overreved" an engine several times during the day. "Overreving" the engine unnecessarily increases wear and tear on the engine. By marking an ETOG display at points where an RPM threshold was exceeded, a corresponding GPS map could show the locations shown at which the "overreving" occurred to determine how the "overreving" might be avoided. When an accident occurs, the time of the accident can be marked on both the GPS map and the ETOG graph to show speed, RPM, and the vehicle's geographic position surrounding the accident.

These are all benefits that cannot be enjoyed from the existing technology because it has not found a way to organize GPS information and trip data in an integrated fashion.

SUMMARY OF THE INVENTION

This invention results from the realization that time stamp recorded trip data such as vehicle RPM, speed, other vehicle data and time stamped geographic positioning of the vehicle can be organized in an integrated fashion to provide a tool for accident or other event reconstruction and to improve driver care of vehicles.

Therefore, it is an object of the invention to provide an added tool for accident reconstruction. It is a further object of the invention to provide trucking companies with a means of monitoring engine RPMs in relation to vehicle geographic position to better understand occurrences of high RPMs. This invention allows one to correlate position on a map with trip data by displaying a map of the vehicle's geographic position and trip data on the same screen in separate windows, each with a marker indicating the time selected. The pointer to the current time on the ETOG graph correlates to a location marked on the map of the vehicle's geographic positioning locations. By sliding the time marker on the ETOG display or clicking on a particular time, the vehicle's geographic positioning on the map will change to the vehicle's position corresponding to the time currently selected in ETOG. By picking a point on the map corresponding to the vehicle's geographic position, the ETOG data corresponding to the time of the vehicle in that geographic position will be shown. Also, by selecting an event criterion (eg., RPM threshold exceeded), multiple events can be recorded and displayed on the ETOG display and the corresponding vehicle position display, in addition to the normally recorded and displayed trip data and vehicle positioning.

BRIEF DESCRIPTION OF THE DRAWINGS

The novel features believed characteristic of the invention are set forth in the claims. The invention itself however, as well as other features and advantages thereof, will be best understood by reference to the description which follows, read in conjunction with the accompanying drawings, wherein:

DETAILED DESCRIPTION OF THE INVENTION

Figure 1:
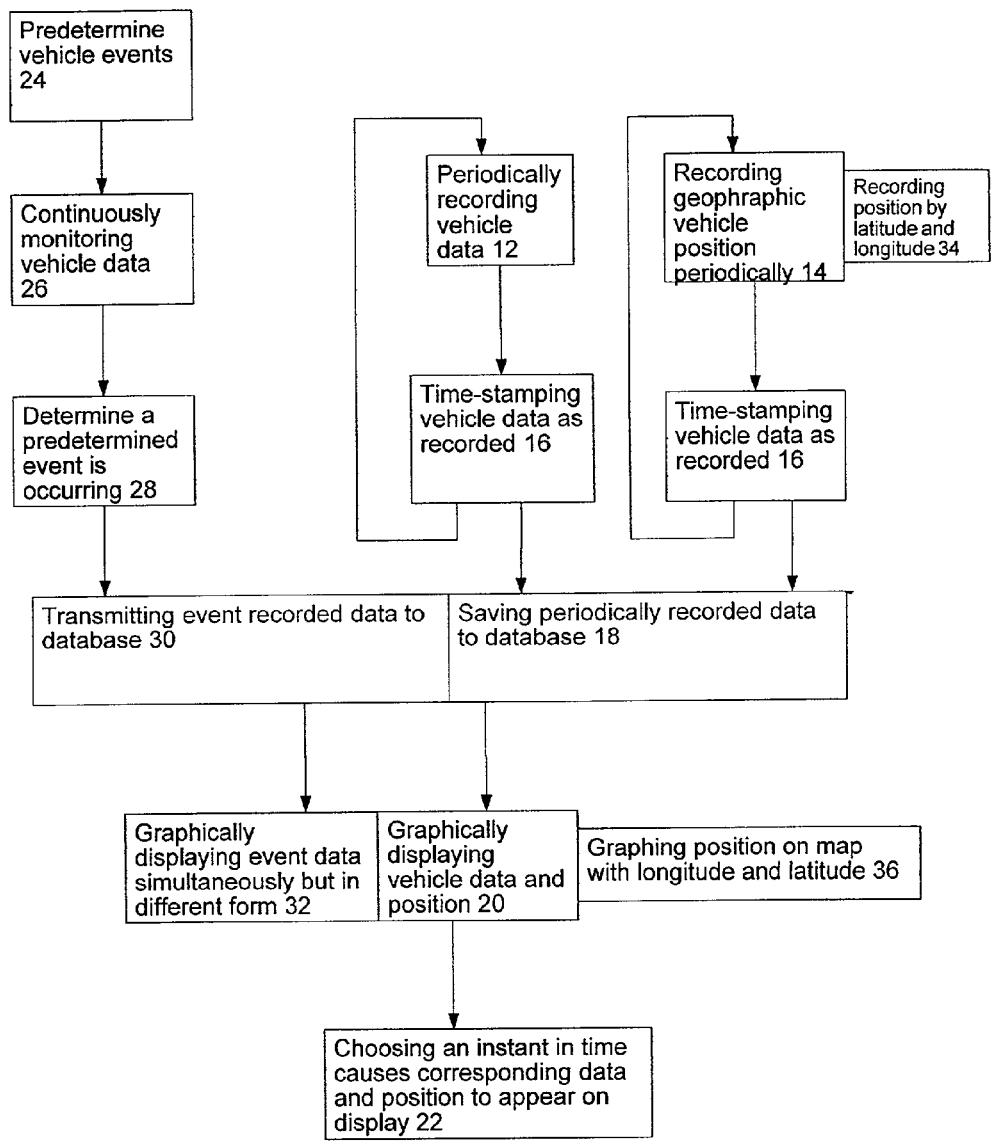
FIG. 1 shows a flow diagram of the operation of the invention in one embodiment.

This invention is an inventive method 10, shown in FIG. 1, for tracking vehicle data in relation to geographic vehicle position. The first steps in the method are recording vehicle data 12 periodically and recording geographic vehicle position 14 periodically. The recorded data and position are time stamped 16. The next step is saving 18 the vehicle information to a database. The vehicle information includes, but is not limited to, each recording for the vehicle data, vehicle position, and time stamping. The final step is graphically displaying 20 the vehicle data and the position simultaneously from the vehicle information in the database.

A further embodiment of this inventive method 10 involves designing the geographic display so that choosing an instant in time 22 causes corresponding recorded vehicle data and geographic position to be displayed.

Another embodiment of the invention 10 involves designing the geographic display so that choosing a geographic position 22 causes temporally corresponding recorded vehicle data to be displayed.

Another embodiment of the inventive method 10 involves the a few additional steps. First, an individual running the method predetermines vehicle events 24. The predetermined events could involve sudden changes in vehicle data, which would be indicative of an accident or the passing of the vehicle over state or national borders. Another predetermined event could be the speedometer or tachometer reaching an illegal or unsafe level. The next step is continuously electronically monitoring 26 vehicle data. Continuously is defined as at least as frequent as the normal recording of vehicle data. The next step in this embodiment is recording vehicle data and geographic vehicle position when vehicle data indicates a vehicle event is occurring 28, thereby recording data for the event rather than waiting for a next period of the periodic recording to initiate recording. The final step in this embodiment is transmitting 30 the data and position to the database. A narrower version of this embodiment includes graphically displaying 32 the data and position from data recorded as a result of a vehicle event differently than the graphically displayed data and position from data periodically recorded. This display 32 could involve marking vehicle event data and positioning with shapes or colors different from the shapes or colors marking periodically recorded vehicle data and positioning.

Another variation on the original inventive method 10 involves graphically displaying the vehicle's geographic position by recording 34 geographic vehicle position periodically in terms of latitude and longitude and plotting 36 the vehicle position on a map containing latitude and longitude information.

The information can be recorded periodically in a number of different ways. The preferred method of periodically recording vehicle data involves basing the periodic interval on time. The preferred method of periodically recording vehicle position involves basing the periodic interval on distance.

Figure 2:
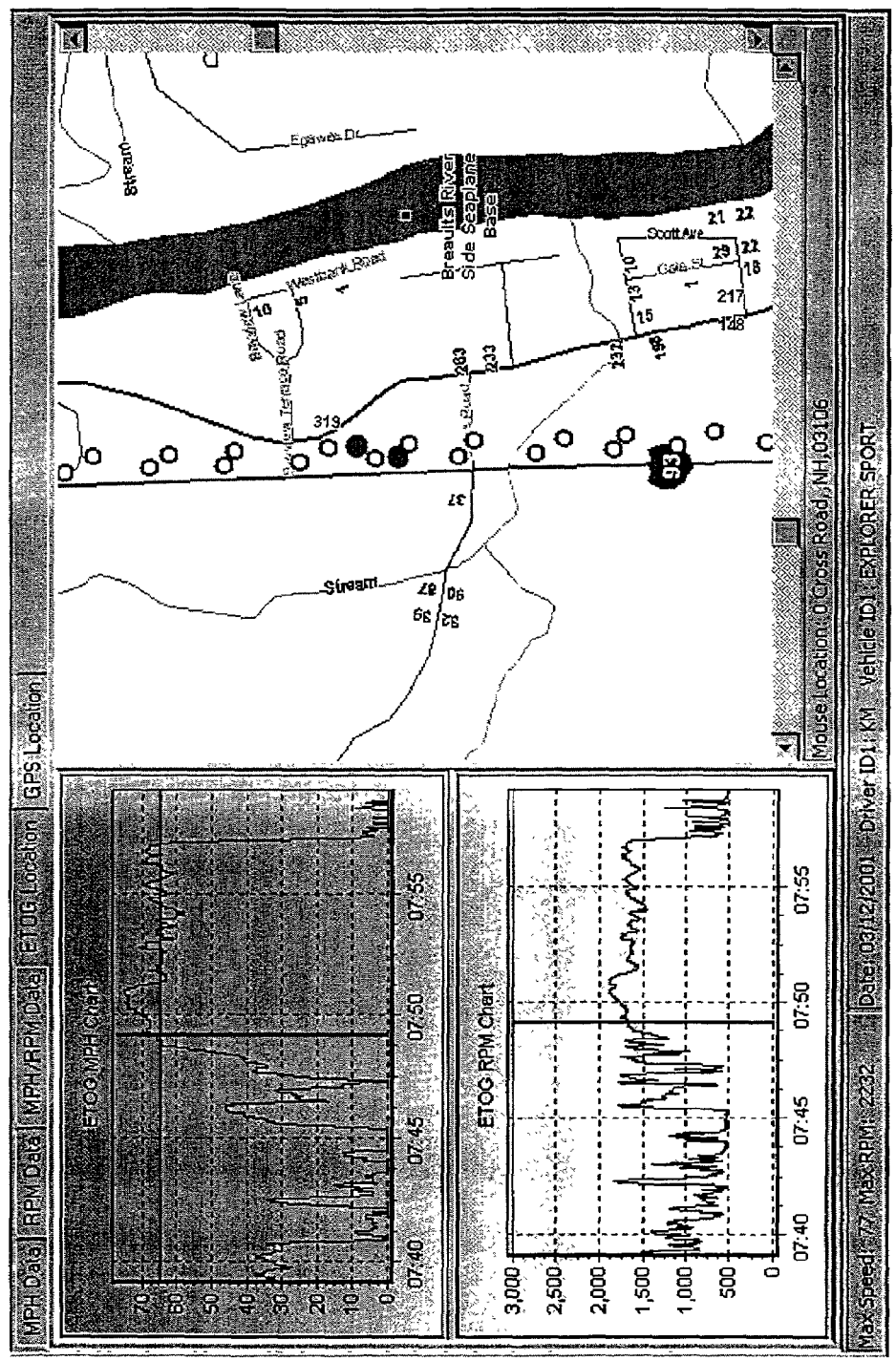
FIG. 2 shows a sample graphic display.
Figure 3:
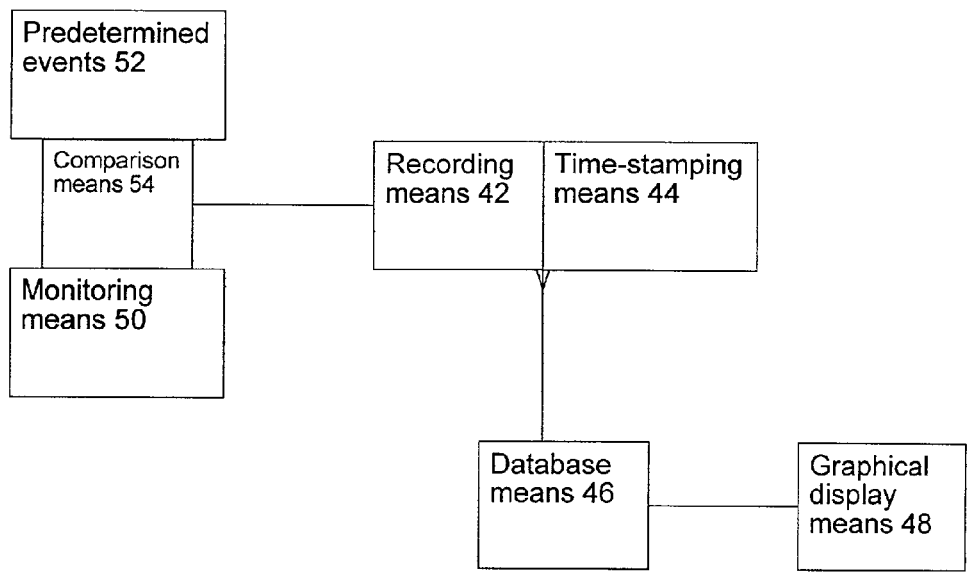
FIG. 3 is a one-line diagram showing the structural interrelationship of the claimed system.
Figure 4:
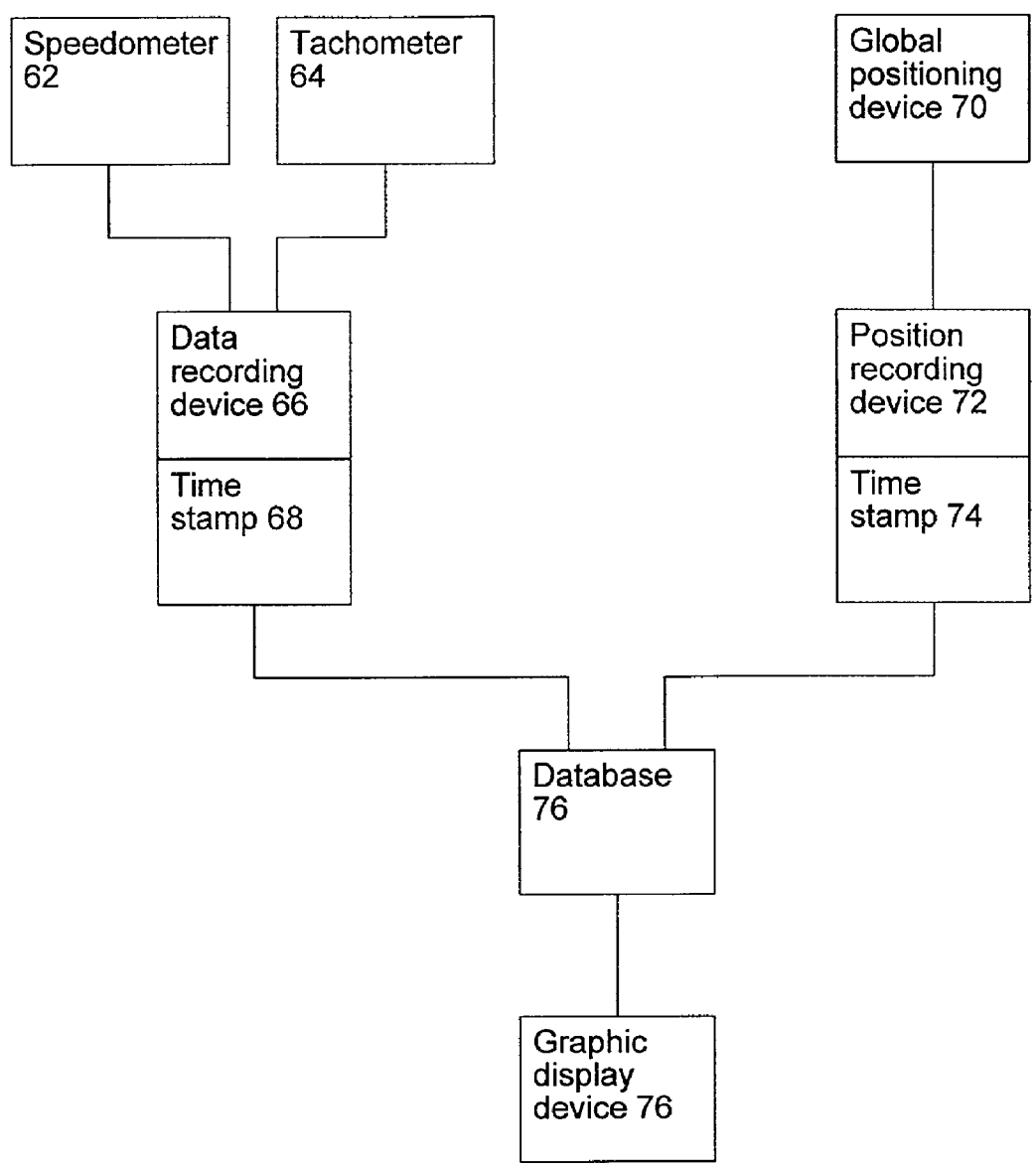
FIG. 4 is a one-line diagram showing the structural interrelationship of the claimed apparatus.

FIG. 2 shows a sample graphic display from the inventive method 10. The display allows simultaneous viewing of corresponding vehicle data and geographic position. In the display, a sample of time and a sample of distance from a vehicle's recorded journey have been selected. Due to the time stamping, the vehicle's RPM, MPH, and position are shown for the same time frame, namely a period of time surrounding 7:49. In this sample, the vehicle data was sampled every second and the geographic position, shown by the open circles along the road, was determined every tenth of a mile. The solid vertical line on both vehicle data charts indicates the occurrence of a predetermined event. The same event is shown on the map by shaded in circles. This particular event was a speeding event. The speed limit is shown on the MPH chart by the solid horizontal line.

In FIG. 2, it should be clear that the non-event geographic position recorded and the corresponding vehicle data recorded are likely not recorded simultaneously. Because the information recorded for geographic position can be based on periodic distance traveled and for vehicle data can be based on periodic passage of time, most of the recordings likely occurred at different instances in time. In other words, if no event had occurred and the vehicle speed was recorded at 7:49.00.00, the vehicle's non-event geographic position may have been recorded at 7:48.58.71 and then again at 7:49.04.36, thereby having no precise position to correlate with the speed at 7:49.00.00. If a user selects the 7.49.00.00 instant in time, the invention may be designed to do one of a number of different things. One option for the invention is to display the nearest recorded point on the map, the 7:48.58.71 recorded position in the above example. Another option would be to interpolate the position of the vehicle on the map based on the two temporally nearest recorded positions, the speed of the vehicle and time selected. Other options are available as well and all are encompassed by this invention.

The invention may also be described as a system 40 for tracking vehicle data in relation to geographic vehicle position. The system includes a recording means 42 for recording vehicle data periodically and geographic vehicle position periodically. The system 40 also includes a time stamping means 44 for time stamping vehicle data and position as it is recorded. The vehicle data, position and time stamping are collectively referred to as vehicle information. The system 40 also includes a database means 46 for storing vehicle information. The database means 46 may exist within the vehicle or at a remote location to which the information is transmitted or transferred. Finally, the system 40 includes a graphical display means 48 for simultaneously graphically displaying vehicle data and position from the information stored in the database. The graphical display means 48 may be a computer monitor or screen, a paper printout, or some other visual medium.

In a narrower embodiment, the system 40 may permit a user to choose an instant in time, which causes corresponding recorded vehicle data and geographic position to be displayed on the graphical display means 48. A similar embodiment may permit a user to choose a geographic position, which causes temporally corresponding recorded vehicle data to be displayed.

Another embodiment of the system 40 for monitoring of predetermined events 52 includes a monitoring means 50 for continuously monitoring vehicle data. This embodiment would also include predetermined events 52 entered by a user of the system, such predetermined events to be of particular interest to the user. The embodiment also includes a comparison means 54 for comparing monitored vehicle data to predetermined events and, when a match is found, signaling the recording means 42 to record the vehicle information. The recording of the vehicle information for predetermined events 52 is indifferent to the periodic recording of vehicle data and position. In other words, the recording of vehicle information for events will neither reset nor interrupt the periodic recording of vehicle information. A narrower version of this embodiment includes having the graphical display means 48 graphically display data and position from information recorded as a result of a vehicle event differently than the information from periodic recordings.

Another embodiment of the system 40 is used when vehicle position is recorded in terms of latitude and longitude and the graphical display means 48 plots the vehicle position on a map containing latitude and longitude information.

The system 40 has periodic recording of information. The periods for recording could be based on a number of different events, such as distance traveled, passage of time, engine rotations, and the like. The preferred embodiment of this system 40 involves recording of vehicle data based on a periodic interval of time and recording vehicle position based on a periodic interval of distance.

The invention can also take the form of an apparatus 60 for tracking vehicle data from a vehicle in relation to geographic position of the vehicle. The apparatus 60 includes a speedometer 62 and a tachometer 64. The speedometer 62 can be any combination of electronic and mechanical devices used to determine speed of the vehicle. The tachometer 64 can be any combination of electronic and mechanical devices used to determine speed of the engine. The apparatus 60 further includes a data recording device 66 for periodically recording speedometer 62 and tachometer 64 readings with a timestamp 68 for each recording. The apparatus 60 further includes a global positioning device 70 and a position recording device 72 for periodically recording the vehicle's global position with a time stamp 74 for each periodic recording. The apparatus 60 further includes a database 76 for storing recorded data and positions. The apparatus 60 further includes a graphic display device 78 for simultaneously displaying the vehicle's data and position from the data and positions stored in the database 76.

We claim:

1. A method for tracking for a vehicle, both geographic position and multiple types of trip data wherein none of the types of trip data is used to determine geographic position, said method comprising:

recording multiple types of trip data not used to determine geographic position periodically and time stamping each periodic recording;

recording geographic position periodically and time stamping each recording;

saving the time stamped trip data and time stamped geographic position in a database;

electronically monitoring multiple types of trip data not used to determine geographic position and recording the trip data and geographic position when trip data indicates one of multiple predetermined trip events is occurring, thereby recording the event trip data and the event geographic position for the occurring trip event rather than waiting for a next period of one of the periodic recordings to initiate recording;

saving the recorded event trip data and event geographic position in the database;

graphically displaying the recorded trip data and the recorded geographic position as a function of time, from the database, wherein the graphically displayed time stamped trip data and time stamped geographic position is displayed differently than the graphically displayed event trip data and event geographic position.

2. The method of claim 1 wherein choosing an instant in time causes corresponding recorded trip data and recorded geographic position to be displayed.

3. The method of claim 1 wherein choosing a geographic position causes temporally corresponding recorded trip data to be displayed.

4. The method of claim 1 further comprising graphically displaying only the event trip data.

5. The method of claim 1 wherein a method for graphically displaying geographic position is further comprising:

recording geographic position periodically in terms of latitude and longitude; and plotting the geographic position on a map containing latitude and longitude information.

6. The method of claim 1 wherein the periodic recording of trip data is based on a periodic interval of time and the periodic recording of geographic position is based on a periodic interval of distance.

* * * * *